United States Patent

Heuser

Patent Number: 5,935,707
Date of Patent: Aug. 10, 1999

[54] PUSH-PULL CABLE

[76] Inventor: Holger Heuser, Lorbeerweg 19, 41469 Neuss, Germany

[21] Appl. No.: 08/827,456

[22] Filed: Mar. 28, 1997

[30] Foreign Application Priority Data

Mar. 29, 1996 [DE] Germany ............ 296 05 892 U

[51] Int. Cl.$^6$ ............ D07B 1/08; F16G 9/00; B32B 3/00
[52] U.S. Cl. ............ 428/383; 428/375; 428/372; 428/377; 428/379; 174/120 SR
[58] Field of Search ............ 428/375, 372, 428/379, 383, 377; 174/110 SR, 120 SR, 110 PM, 110 N

[56] References Cited

U.S. PATENT DOCUMENTS 5,241,880   9/1993   Mizobato et al. ............ 74/502.5

FOREIGN PATENT DOCUMENTS

| 313416 | 4/1989 | European Pat. Off. |
| 438745 | 7/1991 | European Pat. Off. |
| 633291 | 1/1995 | European Pat. Off. |
| 2367936 | 5/1978 | France. |
| 1880165 | 2/1959 | Germany. |
| 1283911 | 8/1972 | United Kingdom. |

OTHER PUBLICATIONS

Patent Abstracts of Japan, Publication No. 59 121216, Published Jul. 13, 1984.
Patent Abstracts of Japan, Outer Casing of Control Cable; M–273, Feb. 3, 1984, vol. 8, No. 26. Vofa GmbH & Co., Kg., p. 1 a) 28–29, 1994.

*Primary Examiner*—William Krynski
*Assistant Examiner*—J. M. Gray
*Attorney, Agent, or Firm*—Liniak, Berenato, Longacre & White, LLC

[57] ABSTRACT

A push-pull cable (1, 6), in particular, for the purpose of actuating bicycle brakes. It has a guide hose (2, 7) and an actuation core (3, 8) that can be moved therein axially. The guide hose (2, 7) has an inside hose (4, 9) and a jacket hose (5, 10) that surrounds the latter. The inside hose (4, 9) consists at least mostly of a polymerized tetrafluoroethylene, while the jacket hose consists at least mostly of a polyarylate, polyacrylimide, polyetherimide, polysulfone, polyphenylenesulfide, polyetherketone and/or liquid-crystalline polymer and/or a synthetic substance whose rigidity and firmness are within the range of rigidity and firmness of the above-mentioned synthetic substances.

19 Claims, 1 Drawing Sheet

PUSH-PULL CABLE

FIELD OF THE INVENTION

This invention relates to a push-pull cable, in particular, for the purpose of actuating bicycle brakes. It has a guide hose and an actuation core that can be moved axially therein. The guide hose has an inside hose and a jacket hose surrounding the latter.

DESCRIPTION OF THE RELATED ART

Push-pull cables of the above-mentioned kind are tried and proven as well as reasonably priced structural elements for the purpose of transmitting forces from an actuation member to a member that is to be actuated, specifically, whenever force transmission cannot be accomplished along a straight line. They are used in many fields of technology (cf., Leiseder, Ludwig M., Mechanische Betätigungszüge [Mechanical Actuation Links], Moderne Industrie Publishers, Landsberg/Lech, 1994), particularly in the field of vehicle engineering. In the case of bicycles, they are used for brake actuation, in other words, the transmission of the manual force exerted upon the brake hand lever upon the brake clasp.

The above-cited book shows that there are push-pull-cables in many different embodiments, in particular, as regards the structure of the guide hose. The structure here is essentially geared toward the forces that are to be transmitted. It is known, for instance, that one can make guide hoses exclusively of synthetic materials; the guide hose in this case can also be structured in the form of two shells: an inside hose and a jacket hose (DE-U-1 880 165). Polyvinylchloride or polyethylene have been proposed here as materials for the jacket hose, while polyamide has been proposed for the inside hose. Of course, such push-pull-caldes are employed on account of the relatively poor firmness and rigidity only in those places where the forces to be transmitted are minor such as, for example, to actuate heating or air conditioning units as inside and outside actuation devices for doors and as a gas tank link unlocking device (see loc. cit., pages 28 and 29).

BRIEF SUMMARY OF THE INVENTION

When used for brake actuation on bicycles, the forces to be transmitted are relatively high so that correspondingly high buckling forces act on the guide hose. In the known push-pull-cables, one does not dispense with a steel wire sheathing, for example, in the form of a steel spiral encased in synthetic substance. A different synthetic substance is used on the inside when compared to the outside. As actuation core, one uses a zinc-coated steel strand that—to prevent the sawing effect—is provided with a polypropylene coating on the inside of the guide hose.

Bicycles are increasingly being used as sports equipment, not only for bicycle races, and in the form of mountain bikes; this is why there are very strict requirements in terms of the efficiency and weight of such push-pull-cables. The known push-pull-cables are relatively heavy, and the efficiency as well as the exactitude still leave room for improvement.

Other push-pull cables are known where the guide hose consists of fiber-reinforced thermoplastic, synthetic resin. The following has been mentioned as synthetic resin: polyetheretherketone, polyethersulfone, polyethyleneterephthalate, polyarylate, polyphenylsulfide, polyimide, polycarbonate and polyethylene terephthalate. Glass fibers or carbon fibers as well as aromatic polyamide fibers and steel fibers have been proposed as fiber reinforcements. The push-pull cables entails the disadvantage that the efficiency is not satisfactory.

The object of the invention is so to design an push-pull cable of the kind mentioned initially that will have a high efficiency and a low weight and that will ensure exact actuation.

This problem is solved, according to the invention, in that the inside hose consists at least mostly of a polymerized tetrafluoroethylene, in particular, polytetrafluoroethylene. The jacket hose consists at least mostly of a high-performance synthetic substance with a high degree of mechanical firmness and rigidity, that is to say, a polyarylate, polyacrylimide, polyetherimide, polysulfone, in particular, polyethersulfone, polyphenylenesulfide, polyetherketone, in particular, polyetheretherketone and/or liquid-crystalline polymer and/or a synthetic substance whose firmness and rigidity are within the range of the firmness and rigidities of the above-mentioned synthetic substances. The jacket of the push-pull cable should not contain any metal sheathing. Fiber sheathing, on the other hand, can consist, for example, of glass fibers or carbon fibers.

The basic idea behind the invention is to perform a kind of division of labor. The inside hose consists of a very low-friction material that ensures a high efficiency, that is to say, extensive transmission of the supplied forces to the brake. The jacket hose is used for absorbing the buckling forces and is therefore made of a high-performance synthetic substance with outstanding mechanical properties. The division of labor makes it possible to use optimum materials for the particular function.

Experiments have shown that such an push-pull cable can absorb even the very highest crushing forces without damage and can at the same time achieve a hitherto unattained efficiency. The materials earmarked for the jacket hose make steel sheathing dispensable and thus make for a very light weight.

Developing the invention, it is provided that the inside hose contain a filler that improves its abrasion resistance. Carbon, for example, in the form of coal or graphite, glass, titanate, and/or polyphenylenesulfide have been considered as fillers here. The filler should be present at least in the area of the inside surface, preferably over the entire cross-section of the inside hose with a content of 5 to 12% by weight; the combination of polyphenylenesulfide and glass is particularly advantageous. In this case, the polyphenylenesulfide should be present at least in the area of the inside surface with a content of 4 to 8% by weight, while the rest consists of glass and polytetrafluoroethylene, whereas the content of glass should be at most 50% of the share of polyphenylenesulfide.

According to another feature of the invention, it is provided that the jacket layer contain a filler that improves the pressure resistance. In this case again, the filler can be carbon, glass, titanate and/or polyphenylenesulfide. The addition of such fillers reduces the elasticity and leads to even more exact actuation.

The actuation core is preferably made as a wire strand with smooth surface that is not encased in synthetic substance. It was found that such a surface is a good friction partner for the material of the inside hose. The wire strand should preferably have a circular cross-section.

According to another feature of the invention, it is provided that the jacket hose and the inside hose be anchored together in a form-locking manner in the axial direction. That can be done by means of projections or recesses along the contact surface between the jacket hose and the inside hose. In particular, one can mold recesses into the outside of the inside hose, and the jacket hose can be sprayed over the inside hose so that the material of the jacket hose will flow into the recesses. In particular, the inside hose has a screw-like groove and/or a screw-like bridge on the outside. The jacket hose engages the groove or bridge.

The drawing illustrates the invention in greater detail on the basis of two exemplary embodiments.

DETAILED DESCRIPTION OF THE INVENTION

Figure 1:
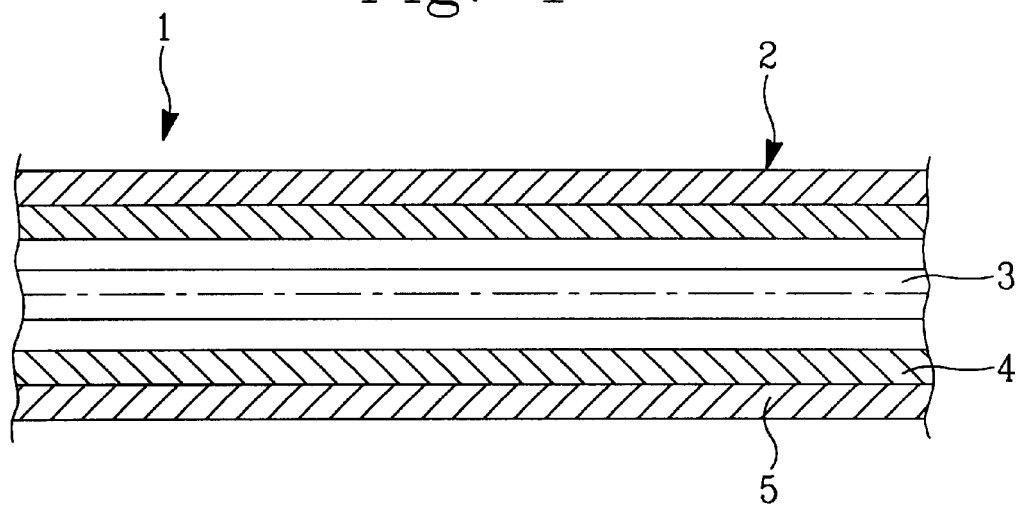
FIG. 1 shows a longitudinal profile through an push-pull cable.

FIG. 1 shows a segment of an push-pull cable 1 that consists of a guide hose 2 and an actuation strand 3. Here, one cannot see that the ends of the guide hose 2 are provided with connection means with which they can be fixed upon the brake actuation device and in the area of the brake clasp. At its ends, actuation strand 3 has elements with which it can be connected to the actuation member, in this case, the brake lever on the handle bar of a bicycle, and with the member to be actuated, that is to say, the brake clasp.

Guide hose 2 consists of two shells; it consists of an inside hose 4 and a jacket hose 5 that surrounds the latter. Both hoses 4, 5 are firmly connected to each other, for example, by extruding jacket hose 5 upon inside hose 4. Inside hose 4 consists of polytetrafluoroethylene in which is placed a filler that improves the abrasion resistance of the polytetrafluoroethylene. Jacket hose 5 consists of polyetherketone that is distinguished by high mechanical firmness and rigidity. Jacket hose 5 thus serves to absorb the buckling forces that occur when force is applied upon the actuation strand 3. Here, the intention is to achieve the least possible change in length during the buckling of guide hose 2.

Actuation strand 3 is calibrated. That is to say, it is made smooth on the outside like a massive wire. The individual wires can be recognized only by their cross-section. The smooth metal surface, together with the outstanding sliding properties of polytetrafluoroethylene, make for low friction resistance and thus high efficiency. The total weight is rather light on account of the exclusive use of synthetic substances for guide hose 2.

Figure 2:
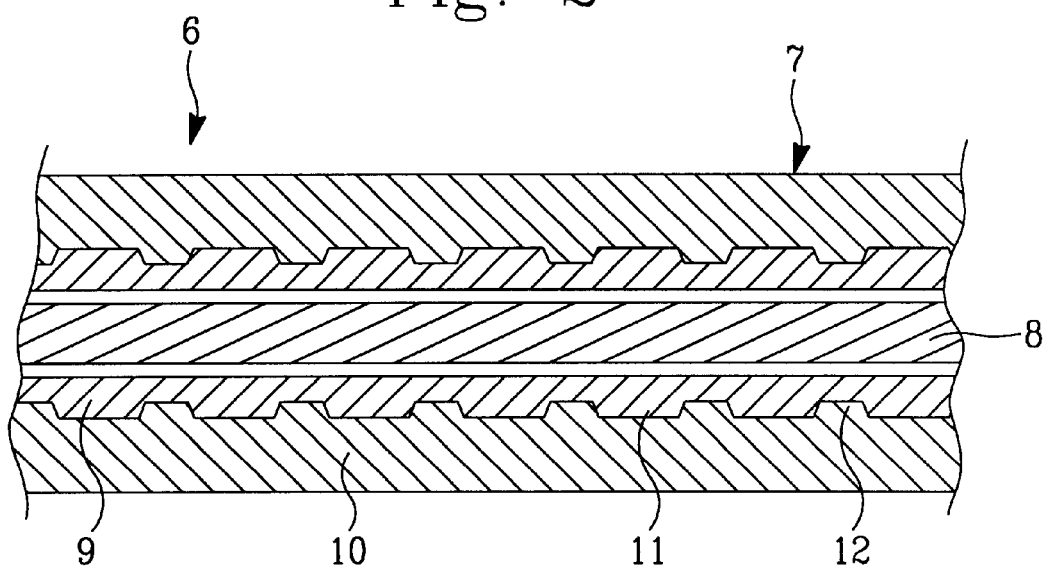
FIG. 2 shows another push-pull cable in a longitudinal profile.

FIG. 2 shows an push-pull cable 6 with guide hose 7 and actuation strand 8. Here again, guide hose 7 is made of two shells and consists of an inside hose 9 and a jacket hose 10 surrounding the latter. The materials agree with the materials described for actuation hose 1, according to FIG. 1.

The only difference with respect to the exemplary embodiment, according to FIG. 1, consists in that the outside of inside hose 9 has projections, for example, labeled 11. Inside hose 9 was first made with a longitudinal bridge on top and on the underside, and that bridge was then removed in certain places at regular intervals with the help of a cutting tool. Therefore, looking at it in the longitudinal direction, one gets an alternation consisting of projections 11 and recesses 12 along the top and underside of inside hose 9. Subsequently, jacket hose 10 was extruded so that its material was able to settle in the recesses 12. In this way, one can make a firm connection between inside hose 9 and jacket hose 10 in an axial direction.

I claim:

1. A push-pull cable, comprising:
  a. a guide hose comprising an inside hose and a surrounding jacket hose, said inside hose comprising polymerized tetrafluoroethylene and said jacket hose consisting essentially of a member selected from the group consisting of polyarylate polyacrylimide, polyetherimide, polysulfone, polyphenylenesulfide, polyether ketone, liquid-crystalline polymer, and synthetic substances having rigidity and firmness corresponding to the rigidity and firmness of the above mentioned members; and
  b. an actuation core axially moveable within said inside hose.

2. The cable of claim 1, wherein said jacket hose is sheathed.

3. The cable of claim 2, wherein said jacket hose is fiber-sheathed.

4. The cable of claim 1, wherein said inside hose includes a filler for improving abrasion resistance.

5. The cable of claim 4, wherein said filler is chosen from the group consisting of carbon, glass, titanate, and polyphenylenesulfide.

6. The cable of claim 5, wherein said filler is a combination of polyphenylenesulfide and glass.

7. The cable of claim 6, wherein said polyphenylenesulfide comprises from about 4% to about 8% by weight, with the balance being glass and polytetrafluoroethylene.

8. The cable of claim 7, wherein the amount of said glass no more than 50% of the polyphenylenesulfide.

9. The cable of claim 4, wherein said filler comprises from about 5 to about 12% by weight of said inside hose.

10. The cable of claim 4, wherein said filler is comprised of particles.

11. The cable of claim 10, wherein said particles have a size from about 1 to about 10 $\mu$m.

12. The cable of claim 11, wherein said jacket hose includes a filler for improving crushing resistance.

13. The cable of claim 12, wherein said filler is selected from the group consisting of carbon, glass, titanate, and polyphenylenesulfide.

14. The cable of claim 1, wherein said actuation core is a smooth surfaced wire strand.

15. The cable of claim 1, wherein said wire strand has a circular cross-section.

16. The cable of claim 1, wherein said jacket hose and inside hose are anchored together.

17. The cable of claim 16, wherein said inside hose has longitudinally extending alternating projections and recesses.

18. A push-pull cable comprising:
  a. a guide hose comprising an inside hose and a surrounding jacket hose, said inside hose comprising polymerized tetrafluoroethylene and said jacket hose consisting essentially of a member selected from the group consisting of polyarylate, polyacrylimide, polyetherimide, polysulfone, polyphenylenesulfide, polyether ketone, liquid-crystalline polymer, and synthetic substances having rigidity and firmness corresponding to the rigidity and firmness of the above mentioned members;
  b. an actuation core axially moveable within said inside hose; and
  c. said inside hose includes a filler and said filler includes of polyphenylenesulfide.

19. A push-pull cable comprising:
  a. a guide hose comprising an inside hose and a surrounding jacket hose, said inside hose comprising polymerized tetrafluoroethylene and said jacket hose consisting essentially of a member selected from the group consisting of polyarylate polyacrylimide, polyetherimide, polysulfone, polyphenylenesulfide, polyether ketone, liquid-crystalline polymer, and synthetic substances having rigidity and firmness corresponding to the rigidity and firmness of the above mentioned members;
  b. an actuation core axially moveable within said inside hose; and
  c. said actuation core is a wire strand.

\* \* \* \* \*